United States Patent [19]

Meyers

[11] Patent Number: 5,291,637
[45] Date of Patent: Mar. 8, 1994

[54] VIBRATION RESISTANT METALLIC TIE

[76] Inventor: Jonathan Meyers, 221 Arleigh Rd., Douglas Manor, N.Y. 11363

[21] Appl. No.: 68,790

[22] Filed: Jun. 1, 1993

[51] Int. Cl.$^5$ .......................... B65D 63/00; F16L 3/00
[52] U.S. Cl. ........................................ 24/25; 24/20 R; 24/136 A
[58] Field of Search .............. 24/25, 24, 20 R, 16 PB, 24/136 A, 115 L

[56] References Cited

U.S. PATENT DOCUMENTS

| | | | |
|---|---|---|---|
| 204,965 | 6/1878 | Gilman | 24/25 |
| 205,720 | 7/1878 | Blossom | 24/25 |
| 225,517 | 3/1880 | Gilman | 24/25 |
| 296,686 | 4/1884 | Gresham | 24/25 |
| 980,700 | 1/1911 | Swafford | 24/25 |
| 1,218,752 | 3/1917 | Farr | 24/136 A |
| 1,628,744 | 5/1927 | Rose | |
| 2,491,290 | 12/1949 | Tinnerman | 24/25 |
| 4,074,916 | 2/1978 | Schinder | |
| 4,366,602 | 6/1983 | Colon | |
| 4,399,592 | 8/1983 | Chopp | |

FOREIGN PATENT DOCUMENTS 0089366 6/1957 Norway ................................. 24/25

Primary Examiner—Victor N. Sakran
Attorney, Agent, or Firm—James & Franklin

[57] ABSTRACT

A resilent element extends from the interior of the locking head into the band receiving cavity. The element exerts a force on the roller, when the roller is in position to retain the band, which has a component directed toward the band, reducing the tendency of the lock to loosen when the tie is subjected to vibration. The resilent element is preferably intergral with the head and takes the form of a spring finger or a bowed spring formed when the head is stamped. Alternately, the element may be a separate part, affixed to the interior of the head wall.

10 Claims, 4 Drawing Sheets

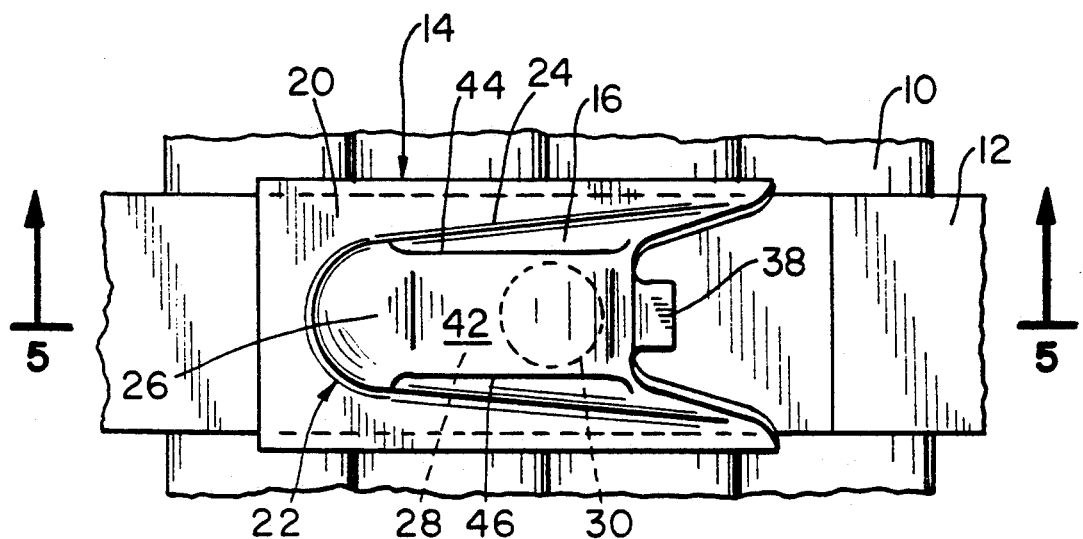
F I G. 4
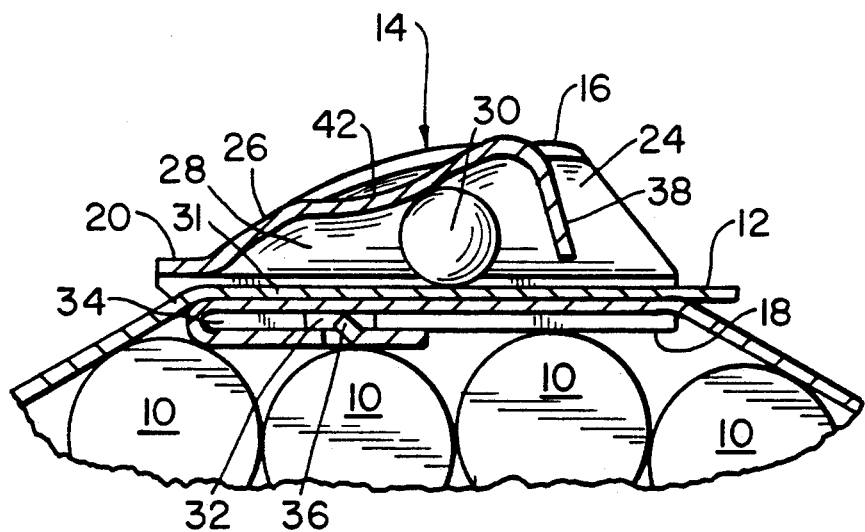
F I G. 5

VIBRATION RESISTANT METALLIC TIE

The present invention relates to metallic ties of the type commonly used to bundle elongated objects such as cables or to join objects together and more particularly to an improved metallic tie having a uniquely structured locking head which is highly resistant to vibration.

Metallic ties, straps and clamps are known and used throughout many industries. They are most commonly made of stainless steel and often used to bundle wires or cables. Hence, they are often referred to as stainless steel cable ties.

Typical cable ties of this sort include a thin elongated stainless steel band. The band may be of various lengths and widths, depending upon the intended application. Affixed to one end of the band is a locking head. The locking head is commonly stamped from a piece of stainless steel stock, such as AISI 302/304 or AISI 316, and then bent into the proper shape.

The locking head and band end to which the head is affixed define a recess or cavity into which the other end of the band is received. The cavity is generally wedged shaped, defined in part by a portion of the cavity wall which is inclined toward the insertion end of the head.

A metal roller is situated within the cavity. The roller and the inclined cavity wall cooperate functioning as a locking device to retain the received end of the band in a fixed position within the head.

The roller is moveable within the head cavity from a position relatively remote from the insertion end, in which the free end of the band can be inserted into the cavity, to a position proximate the insertion end, in which the roller frictionally engages and clamps the inserted band end. The band end is engaged by the roller with a great deal of force so as to prevent the inserted end from moving relative to the head in a direction opposite to that of insertion.

Because stainless steel ties of this type are often installed in odd orientations, attempts have been made to prevent loosening of the tie by including a means in the locking head for exerting a force on the surface of the inserted band end, in the direction of the roller. For example, U.S. Pat. No. 4,366,602 issued Jun. 4, 1983 to F. Colon and J. Cavency and entitled "Metal Tie" teaches forming the end of the band to which the locking head is affixed (and therefore forms the floor of the cavity) with a portion which has an upwardly bowed portion defined by a pair of spaced slots. This bowed portion is taught as pushing the inserted band end upwardly, from underneath, into contact with the roller during threading. The bowed portion is flattened against the floor of the cavity as the roller moves to the locking position.

A structure with a similar function is taught in U.S. Pat. No. 4,399,592 issued Aug. 23, 1983 to J. Chopp, Jr. and L. Mohr entitled "Metal Tie". That patent teaches a strap deflection element in the form of a protrubuance in the end of the band to which the head is affixed. This portrubuance causes the insertion end of the band to bend toward the roller.

In both of these patents, the operative means is provided on the end of the band to which the head is affixed, that is, in the floor of the cavity of the locking head. In each, the means functions to exert force on the underside of the inserted end of the band when the end of the band is received in the cavity. In neither case is the force exerting part on the locking head itself or integral therewith, nor does it exert a force on the roller in the direction of the inserted band.

I am also aware of other types of locking devices which employ rollers in wedge shaped cavities where spring elements are used. For example, U.S. Pat. No. 1,628,744 issued to W. Rose on May 27, 1927 teaches a tool for gripping steel tape. Within the steel block, the serrated edge of a disk is urged toward the insertion end with an inclined roof. However, the force exerted by the spring element has no component directed toward the insertion end of the band. It is, instead, directed generally parallel to the band surface.

U.S. Pat. No. 4,074,916 issued Feb. 21, 1978 to R. Schinder teaches a locking mechanism in which a part is forced into the flattened portion of a cable by a cam with an inclined surface. A roller is biased toward the inclined surface of the cam by a spring.

While the Rose and Schinder patents teach devices in which a spring contacts the roller directly, neither teaches a spring which extends from or is an integral part of the inclined wall which partially defines the band receiving cavity.

In my invention, resilient means are provided which extend from the inclined wall of the cavity to contact the roller directly. Preferably, the resilient means is an integral part of the cavity wall, having been formed as the head is stamped out of a sheet of stainless steel stock. However, in one preferred embodiment, the resilient is a separate part or parts affixed to the interior surface of the inclined wall.

My invention substantially reduces the tendency of vibrations to loosen the locked tie. Moreover, it accomplishes this objective in the simplest, most elegant and cost effective manner, providing the desired function while adding little if anything to the cost of manufacturing the tie.

It is, therefore, a prime object of the present invention to provide a vibration resistant metallic tie.

It is another object of the present invention to provide a vibration resistant tie in which the head includes a resilient element which extends from the inclined wall of the cavity into contact with the roller.

It is another object of the present invention to provide a vibration resistant stainless steel tie in which the resilient element is formed at the time that the head is stamped.

It is another object of the present invention to provide a vibration resistant stainless steel tie which costs substantially the same to fabricate as a conventional tie of this type.

In accordance with the present invention, a tie is provided with an elongated metallic band having first and second ends. A metallic locking head is mounted proximate the first end of the band. The head includes a inclined wall which partially defines a cavity adapted to receive the second end of the band. Roller means is situated within the cavity and moveable between a first position, in which the second end of the band is received within the head, and a second position, in which the roller means retains the second end of the band in a substantially fixed position relative to the head. The head further comprises resilient means, extending from the inclined wall, into contact with the roller means, when the roller means is in the second position, for exerting a force on the roller means having a component directed toward the second end of the band.

Preferably, the resilient means includes an integral portion of the inclined wall. In particular, the resilient means preferably comprises a portion of the wall which is bent inwardly toward the cavity. The bent portion is defined in part by substantially parallel spaced cuts in the wall forming a bow. The portion may additionally be defined in part by a substantially transverse cut, extending between the parallel cuts, to form a spring finger.

The inclined wall has an interior surface. The resilient means is part of or affixed to the interior surface.

The resilient means may take the form of an element mounted on and extending from the interior surface of the locking head in a plane substantially perpendicular to the plane of the second end. Alternatively, it may take the form of first and second spaced elements mounted on and extending from the surface in spaced planes substantially perpendicular to the plane of the second end.

To these and such other objects which may hereinafter appear, the present invention relates to a vibration resistant metallic tie, as set forth in detail in the following specification and recited in the annexed claims, taken together with the accompanying drawings, in which like numerals refer to like parts, and in which:

FIG. 4 is an enlarged top plan view of the locking head of a second preferred embodiment of the present invention;

FIG. 5 is a cross-sectional view taken along line 5—5 of FIG. 4;

Figure 6:
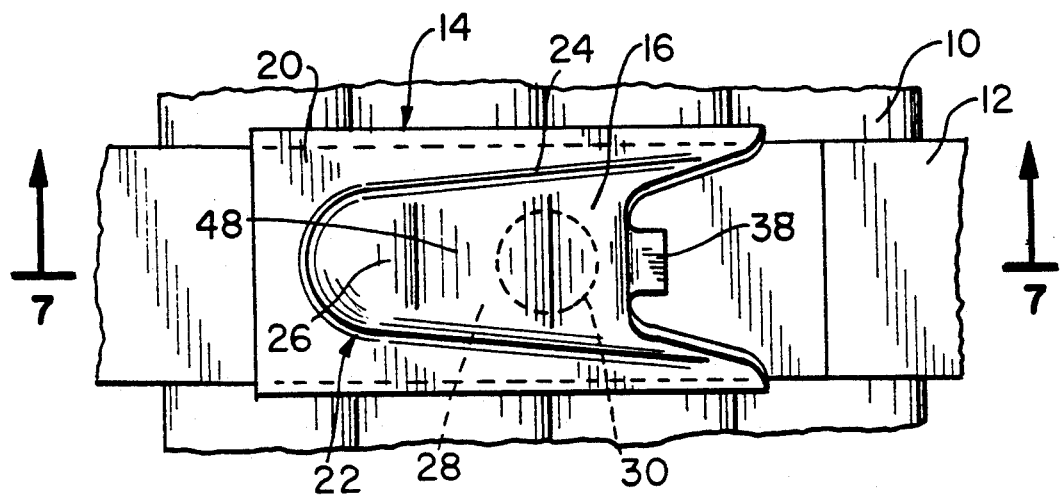
FIG. 6 is an enlarged top plan view of the locking head of a third embodiment of the present invention.
Figure 7:
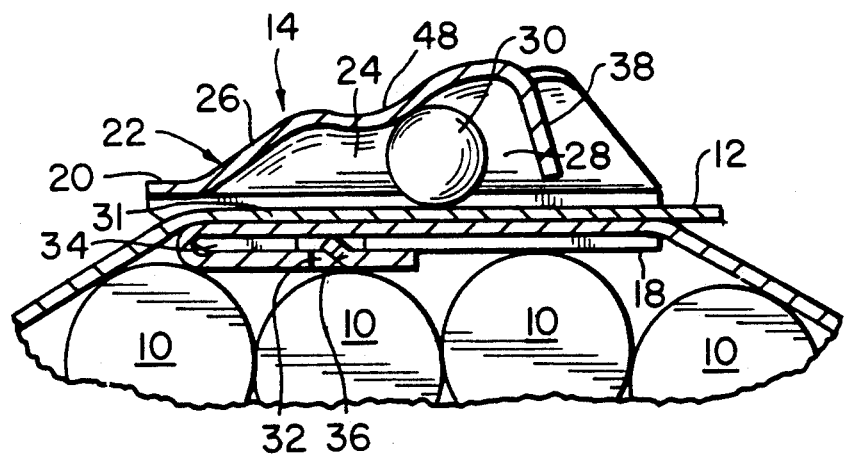

FIG. 7 a cross-sectional view taken along line 7—7 of FIG. 6.

Figure 8:
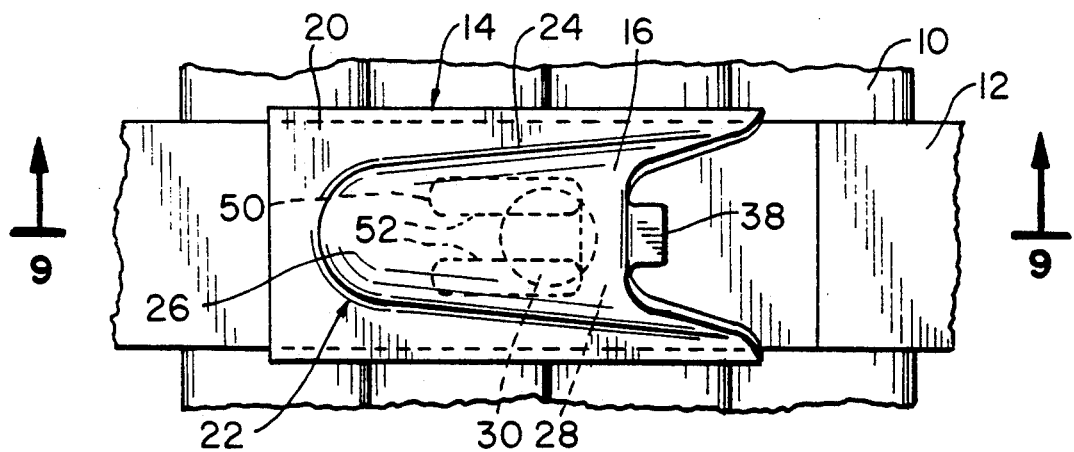
Figure 9:
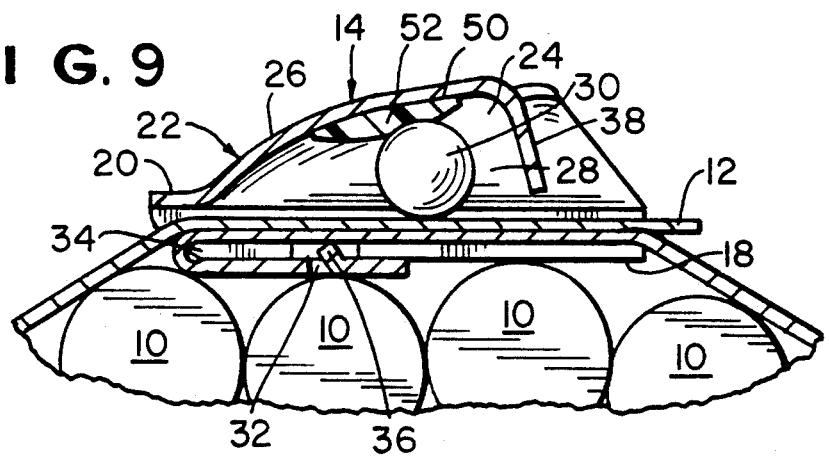

FIG. 8 is an enlarged top plan view of the locking head of a fourth preferred embodiment of the present invention; and FIG. 9 is a cross-sectional view taken along lines 9—9 of FIG. 8.

Figure 1:
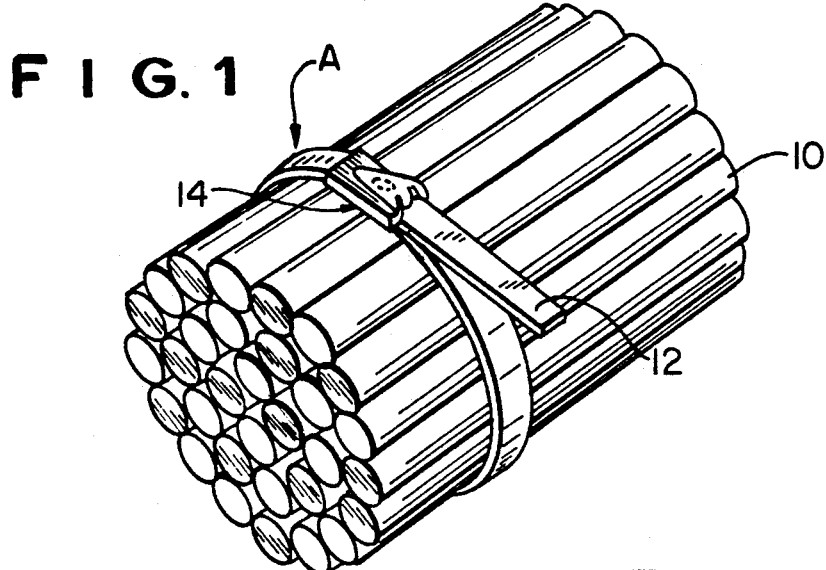
FIG. 1 is an isometric view of a bundle of rods retained by a tie of the present invention.

FIG. 1 illustrates the tie of the present invention, generally designated A, as it might be used to bundle a plurality of elongate objects such as rods 10. Tie A includes a metallic, preferably stainless steal, band 12. Band 12 can be tightened relative to the locking head, generally designated 14, as desired, by pulling the free end of end of band 12 through head 14, until the desired tension is attained. The tie will automatically lock in position.

Figure 2:
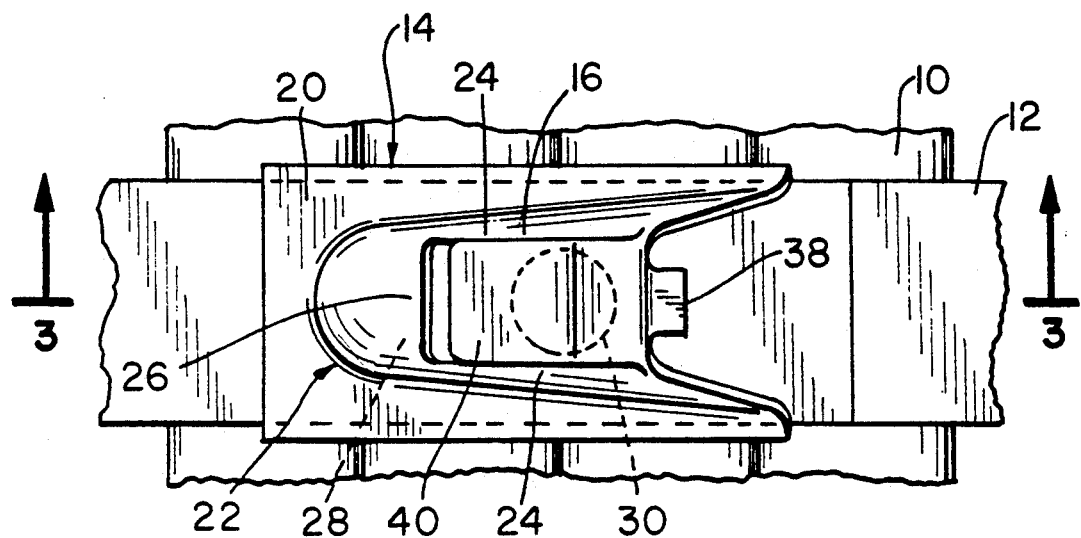
FIG. 2 is an enlarged top plan view of the locking head of a first preferred embodiment of the present invention.
Figure 3:
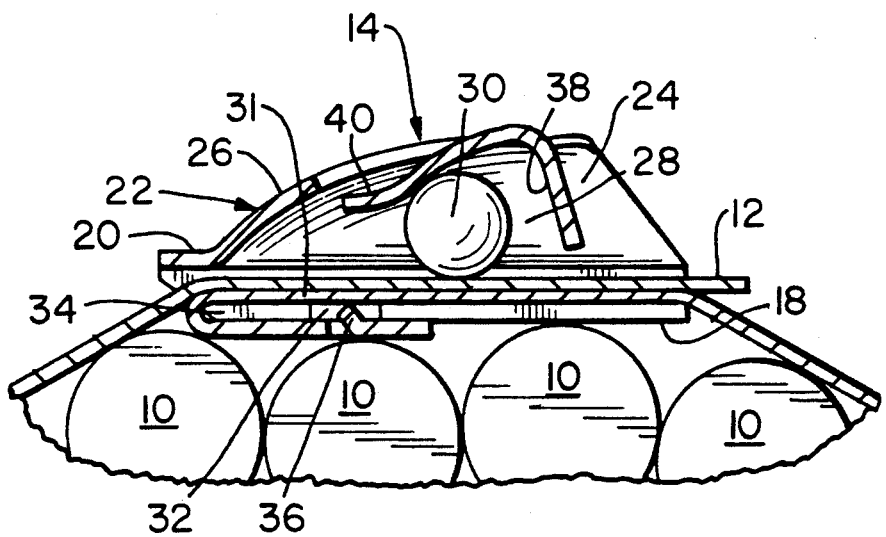
FIG. 3 is a cross-sectional view taken along line 3—3 of FIG. 2.

FIGS. 2 and 3 illustrate the structure of the first preferred embodiment of locking head 14. Head 14 preferably comprises a single piece of stainless steel stock which is stamped or otherwise formed by cutting and shaping operations into an upper portion 16 and a lower portion 18 (FIG. 3). The upper portion 16 includes a planar, somewhat "U" shaped (as seen from above) skirt section 20 and a arcuate or dome-like section 22 which defines the sloping sides 24 and inclined roof 26 of a generally wedge shaped locking cavity 28.

Within cavity 28 is a metal locking roller 30 which is moveable between a position (towards the right as seen in FIGS. 2 and 3) in which the free end of the band 12 can be inserted into head 14 and a position (towards the left as seen in FIGS. 2 and 3) wherein the free end of band 12 is locked in position relative to the head.

The lower portion 18 of head 14 is bent into position in a plane generally parallel to the plane of section 20 of upper portion 16, but spaced therefrom. Portion 18 is provided with an opening 32 therein. Head 14 is mounted to the end 31 of band 12 by inserting end 31 into rear (right as seen in the drawings) opening in cavity 28 and bending end 31 around the front (left as seen in the drawings) edge 34 of portion 18. A protrusion 36 is then bent into opening 32 to insure that the locking head will remain permanently affixed t end 31 of the band.

Between end 31 which forms the floor of cavity 28 and section 20 is clearance to permit the free end of band 12 to be inserted into the cavity. Roller 30 is free to move within the wedge shaped cavity 28 which is defined in part by a downwardly extending member 38. Member 38 defines the rear of cavity 28. When roller 30 is adjacent member 38, the free end of band 12 may be easily inserted into the cavity. Roller 30 will move in the locking head away from member 38 to a position to clamp the free end of the band, as the band is tightened and there is force on the band tending to pull the band out of the locking head. Roller 30 cooperates with the inclined roof 26 of the locking head to provide a positive mechanical locking action preventing the band from being pulled out of the head.

In the conventional locking heads, the roof 26 is convex or dome shaped in configuration. This configuration may result in loosing of the locking mechanism if the tie is subjected to vibration. Such loosening may be extremely detrimental, particularly in certain sensitive environments, for example, nuclear power plants.

My invention makes the locking head substantially less sensitive to vibration and greatly reduces the tendency for the tie to loosen under such conditions. It accomplishes this by substantially increasing the locking force transmitted by the roller on the inserted band end by providing an additional significant force on the roller with a substantial component directed toward the band surface.

This force is provided, in the first preferred embodiment, by a spring element or finger 40. Finger 40 is cut out of roof 26 of upper portion 16 of the locking head by making first and second longitudial cuts and a transverse cut. Finger 40 is then bent inwardly toward cavity 28. Preferably, finger 40 is formed at the time and by the very same operations which form upper portion 16 of the locking head and is integral with the wall which defines the locking head. No additional material or manufacturing operations are required if finger 40 is formed in this manner.

Finger 40 is relatively strong and resilient, being formed of the same AISI 302/304 or AISI 316 non-magnetic stainless steel as the head itself. Once tie A is installed and roller 30 is securely wedged between finger 40 and band 12, within cavity 28, subjecting the tie to vibration is much less likely to loosen it.

A second preferred embodiment is illustrated in FIGS. 4 and 5. In this embodiment, Finger 40 is replaced by a bowed spring element 42 which is defined between spaced longitudial cuts 44, 46 and then is bent inwardly. Unlike finger 40, element 42 is not cut or separated from roof 26 at its forward end. However, element 42 operates in substantially the same manner as finger 40, with substantially the same result.

A third embodiment is illustrated in FIGS. 6 and 7. In this embodiment, there are no cuts in roof 26 at all, only a substantially hemispherical indentation which forms an inwardly directed protrusion 48 in the interior surface of roof 26. Protrusion 48 has spring-like qualities and functions in the same manner as finger 40.

FIGS. 8 and 9 illustrate the fourth preferred embodiment. In this embodiment, arcuate roof 26 of upper portion 16 retains its convex shape. A separate element 50, preferably also made of stainless steel, is affixed to the interior surface roof 26 by any conventional means. Element 50 comprises a pair of parts 52 which are situated in spaced parallel planes, substantially perpendicular to the plane of band 12, on either side of the center of roller 30. Parts 52 provide the same spring-like function as finger 40, as well as an additional force tending to maintain the roller centered on the centerline of the head.

It should now be appreciated that the present invention relates to a vibration resistant metallic tie in which a spring element, preferably integral with and formed at the same time as the locking head, applies a force directly on the locking roller with a significant component in the direction of the band. In this way, a superior function is obtained with little if any additional cost.

While only a limited number of preferred embodiments have been disclosed for purposes of illustration, it is obvious that many variations and modifications could be made thereto. It is intended to cover all of these variations and modifications which fall within the scope of the present invention, as defined by the following claims:

I claim:

1. A tie comprising an elongated metallic band having first and second ends and a metallic locking head mounted proximate said first end of said band, said head defining a cavity for receiving said second end of said band and comprising an inclined wall and roller means situated within said cavity, said roller means being moveable between a first position, in which said second end of said band is receivable within said head, and a second position, in which said roller means cooperates with said inclined wall to retain said second end of said band in a substantially fixed position relative to said head, said head further comprising resilient means, extending from said inclined wall, into contact with said roller means, when said roller means is in said second position, for exerting a force on said roller means having a component directed toward said second end of said band.

2. The tie of claim 1 wherein said resilient means comprises an integral portion of said inclined wall.

3. The tie of claim 2 wherein said integral portion comprises a protrusion in said inclined wall extending toward said roller.

4. The tie of claim 3 wherein said protrusion has a substantially hemispherical shape.

5. The tie of claim 1 wherein said inclined wall has an interior surface and wherein said resilient means is affixed to said interior surface.

6. The tie of claim 1 wherein said resilient means comprises an element extending from said surface in a plane substantially perpendicular to the plane of said second end.

7. A tie comprising an elongated metallic band having first and second ends and a metallic locking head mounted proximate said first end of said band, said head defining a cavity for receiving said second end of said band and comprising an inclined wall and roller means situated within said cavity, said roller means being moveable between a first position, in which said second end of said band is receivable within said head, and a second position, in which said roller means cooperates with said inclined wall to retain said second end of said band in a substantially fixed position relative to said head, said head further comprising resilient means, extending from said inclined wall, into contact with said roller means, when said roller means is in said second position, for exerting a force on said roller means having a component directed toward said second end of said band, said resilient means comprising a finger which is an integral portion of said inclined wall and is bent inwardly toward said cavity.

8. The tie of claim 7 wherein said finger is defined in part by substantially parallel spaced cuts in said wall.

9. The tie of claim 8 in which said finger is defined in part by a transverse cut extending between said parallel spaced cuts.

10. A tie comprising an elongated metallic band having first and second ends and a metallic locking head mounted proximate said first end of said band, said head defining a cavity for receiving said second end of said band and comprising an inclined wall and roller means situated within said cavity, said roller means being moveable between a first position, in which said second end of said band is receivable within said head, and a second position, in which said roller means cooperates with said inclined wall to retain said second end of said band in a substantially fixed position relative to said head, said head further comprising resilient means, extending from said inclined wall, into contact with said roller means, when said roller means is in said second position, for exerting a force on said roller means having a component directed toward said second end of said band, wherein said resilient means comprises first and second spaced elements extending from said surface in planes substantially perpendicular to the plane of said second end.

* * * * *